United States Patent [19]

Enjo et al.

[11] Patent Number: 4,557,851
[45] Date of Patent: Dec. 10, 1985

[54] WORKING FLUIDS FOR THE RANKINE CYCLE COMPRISING TRICHLOROFLUOROMETHANE AND 1,1-DIFLUOROETHANE, ISOBUTANE OR OCTAFLUOROCYCLOBUTANE

[75] Inventors: Naonori Enjo, Suita; Masahiro Noguchi, Osaka; Satoshi Ide, Settsu, all of Japan

[73] Assignee: Daikin Kogyo Co., Ltd., Japan

[21] Appl. No.: 632,276

[22] Filed: Jul. 20, 1984

Related U.S. Application Data

[63] Continuation of Ser. No. 511,584, Jul. 7, 1983, abandoned.

[30] Foreign Application Priority Data

Jul. 14, 1982 [JP] Japan .............................. 57-123441
Jul. 14, 1982 [JP] Japan .............................. 57-123440
Jul. 14, 1982 [JP] Japan .............................. 57-123439

[51] Int. Cl.[4] .......................... C09K 3/18; C09K 5/04; C01B 2/00; F01K 27/00
[52] U.S. Cl. ........................................ 252/70; 252/67; 252/372
[58] Field of Search ................................. 252/67, 372

[56] References Cited

U.S. PATENT DOCUMENTS

| 3,516,248 | 7/1968 | McEwen ............................... 252/67 |
| 4,055,049 | 10/1977 | Murphy et al. ........................ 252/67 |
| 4,057,974 | 11/1977 | Murphy et al. ........................ 252/67 |
| 4,285,211 | 8/1981 | Clark ..................................... 62/335 |

FOREIGN PATENT DOCUMENTS 0473740 9/1975 U.S.S.R. .
0579296 11/1977 U.S.S.R. .
0676604 7/1979 U.S.S.R. .

Primary Examiner—John E. Kittle
Assistant Examiner—Mukund J. Shah
Attorney, Agent, or Firm—Larson and Taylor

[57] ABSTRACT

Working fluids for the Rankine cycle comprising trichlorofluoromethane and a member selected from the group consisting of difluoroethane, isobutane and octafluorocyclobutane.

2 Claims, 7 Drawing Figures

WORKING FLUIDS FOR THE RANKINE CYCLE COMPRISING TRICHLOROFLUOROMETHANE AND 1,1-DIFLUOROETHANE, ISOBUTANE OR OCTAFLUOROCYCLOBUTANE

This application is a continuation of application Ser. No. 511,584 filed July 7, 1983, abandoned.

This invention relates to novel working fluids for a Rankine cycle.

Heretofore water has been almost exclusively used as a working fluid in the Rankine cycle in which thermal energy is converted into mechanical energy by repeating a cycle comprising vaporizing a liquid medium with heating, expanding the vapor in an expansion device to produce mechanical energy, and then compressing by a pump to condense the medium. Although long applied as a working fluid to steam engines, water has the following drawbacks. It has a limited application due to its high freezing point and great specific volume on vaporization; requires a larger installation and is lower in efficiency when using a low-temperature heating source; and readily freezes and is not workable at low temperatures.

While various organic working fluids have been proposed instead of water to eliminate the above drawbacks. Most of them are found to be unsatisfactorily usable due to their inflammability, corrosivity, and so on. Among these fluids trichlorofluoromethane (hereinafter to be referred to as Flon-11) is used in practice. However, Flon-11 has the following drawbacks as the working fluids for the Rankine cycle. It has low efficiency in conversion of thermal energy into mechanical energy, having further reduced efficiency particularly at a higher heating temperature range where it is decomposed to change its thermodynamic properties. When thermally decomposed, Flon-11 produces free chlorine to cause corrosion of apparatus. Because of the above-mentioned drawbacks, Flon-11 is not suited as a working fluid which is usable for any kind of heat sources. Thus, there is an intensive demand to the development of working fluids usable for the Rankine cycle with an improved conversion efficiency and thermal stability.

To meet such demand for satisfactory working fluids, we conducted extensive research and found that a mixture of substances having different properties exhibits a superior properties to those of working fluids comprising a single substance which have heretofore been studied and that, particularly, a mixture of Flon-11 with a member selected from the group consisting of 1,1-difluoroethane (hereinafter referred to as Flon-152a), isobutane and octafluorocyclobutane (hereinafter referred to as Flon-C318) gives markedly excellent properties as a working fluid for the Rankine cycle.

It is an object of this invention to provide working fluids for a Rankine cycle which fluids can exceedingly increase the efficiency of conversion of thermal energy to mechanical energy.

It is another object of this invention to provide working fluids for a Rankine cycle which fluids have a markedly high stability at a high-temperature range and can be used with safety.

These objects and other characteristics of this invention will become apparent from the following description.

The foregoing objects can be achieved by using a working fluid which comprises Flon-11 and a member selected from the group consisting of Flon-152a, isobutane and Flon-C318.

The working fluids of this invention can be easily prepared by mixing the above specified components in an appropriate ratio.

The working fluids of the invention comprising a mixture of Flon-11 with one of Flon-152a, isobutane and Flon-C318 have the following advantages over heretofore known working fluids.

The working fluids of the present invention produces a markedly higher efficiency in conversion of thermal energy into mechanical energy than those produced by a heretofore known working fluid such as Flon-11.

Further, while an inflammable or explosive medium have a limited application for use as a working fluid, the working fluids of the invention is neither inflammable nor explosive. Flon-152a, which is inflammable by itself, can be made less inflammable when mixed with Flon-11, and becomes noncombustible in the range of content of higher than 69% of Flon-11. In the content of 69 to 50% of Flon-11, the inflammability of the medium is greatly reduced to a low level which is practically harmless in the application.

The mixture of Flon-11 and isobutane is inflammable at the content of 50% of isobutane, though the range of explosion is narrow and extremely less dangerous as compared with isobutane alone and therefore is usable in practice.

The mixture of Flon-11 and Flon-C318 is not inflammable or explosive in any content of air mixed therewith. Accordingly, the mixture of Flon-11 with Flon-C318 is usable in a wide range of composition.

According to the present invention, particularly significant improvement of the efficiency in power output can be obtained with use of a working fluid comprising about 95 to about 50% by weight of Flon-11 and about 5 to about 50% by weight of Flon-152a or isobutane or a working fluid comprising about 80 to about 20% by weight of Flon-11 and about 20 to about 80% by weight of Flon-C318.

Referring to the accompanied drawings.

Figure 3:
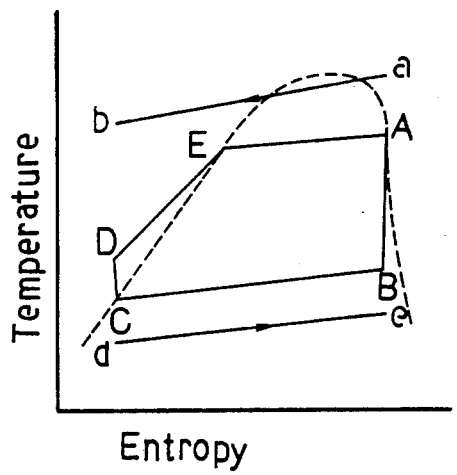
FIG. 3 shows a temperature-entropy diagram of the Rankine cycle in which a mixture of Flon-11 and Flon-152a is used as a working fluid. The alphabets (A to E) appearing in FIG. 3 correspond respectively to those in FIG. 1 and represent points of state of the working fluid.
Figure 5:
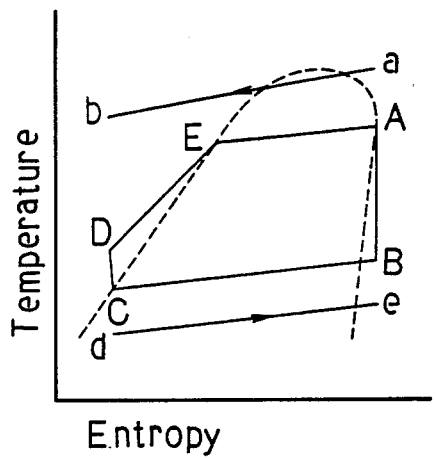
FIG. 5 shows a temperature-entropy diagram of the Rankine cycle in which a mixture of Flon-11 and isobutane is used as a working fluid. The alphabets (A to E) appearing in FIG. 5 correspond to respectively to those in FIG. 1 and represent points of state of the working fluid.
Figure 7:
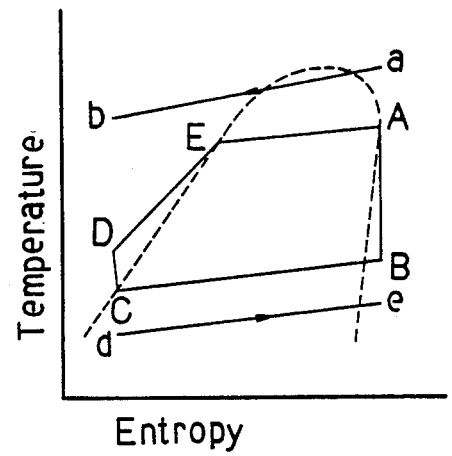
FIG. 7 shows a temperature-entropy diagram of the Rankine cycle in which a mixture of Flon-11 and Flon-C318 is used as a working fluid. The alphabets (A to E) appearing in FIG. 7 correspond to respectively to those in FIG. 1 and represent points of state of the working fluid.

Referring to the Figures, a working fluid is heated and vaporized in the evaporator 4 to produce vapor of high temperature and high pressure. The change of state is shown by D, E and A in FIGS. 3, 5 and 7 where the liquid-phase working fluid is heated to a boiling temperature at which the total fluid vaporizes. The vapor is then superheated (as shown by the change from E to A), and enters the expansion device 1 in which the super-heated vapor is adiabatically expanded. At the time, the temperature and pressure are lowered and the state of the fluid is changed from A to B as shown in FIGS. 3, 5 and 7 for the fluid to conduct the work. The vapor-phase working fluid at lowered temperature and pressure is then sent to the condenser 2 where it is cooled by a low-temperature heat source to condense and get into a liquid phase (as indicated by the change from B to C in FIGS. 3, 5 and 7). Thereafter the fluid is returned to the pump 3 to repeat the cycle. In FIGS. 3, 5 and 7 the point a represents the state of a heat source, e.g. warm water, when it enters the evaporator, b represents the state of the heat source when it leaves the evaporator and the arrow in the line from a to b indicates the direction of flow of the heat source. The point d represents the state of cold water at the inlet of condenser, the points e represents the state of the same at the outlet of the condenser and the arrow on the line from d to e indicates the direction of flow of the cold water.

Usable as the expansion device for a Rankine cycle system are for example rotating or reciprocating displacement expansion devices and turbine expansion devices. Boilers commonly used to produce steam are usable as the evaporator for the system. Illustrative of usable condensers are those of the type as used in refrigerating apparatus. Employable as the pump are pressure liquid feed pumps for organic solvents generally used in chemical industries.

While the working fluid of the present invention can be used alone, other additives may be used conjointly therewith when required. For example, with a mixture of Flon-11 and Flon-152a, Flon-152a which is inflammable and has a boiling point lower than Flon-11 becomes richer than Flon-11 in the vapor phase thus increasing the inflammability of the mixture. The inflammability can be reduced by adding other Flon gases such as Flon-114 (dichlorotetrafluoroethane), Flon-12 (dichlorodifluoromethane), Flon-22 (chlorodifluoromethane) or Flon-13B1 (bromotrifluoromethane). Generally, these other Flon gas can be added in an amount of less than 50% by weight based on the amount of Flon-152.

The invention will be described below in more detail with reference to examples and comparison examples wherein the ratio of the constituents will be indicated in % by weight unless otherwise specified.

EXAMPLES 1-9 AND COMPARISON EXAMPLE

Figure 1:
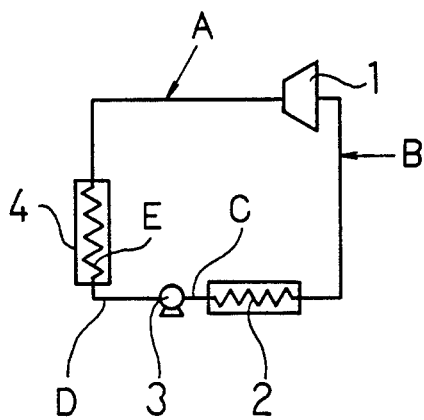
FIG. 1 is a flow sheet of the Rankine cycle carried out for conversion of thermal energy into mechanical energy.
Figure 2:
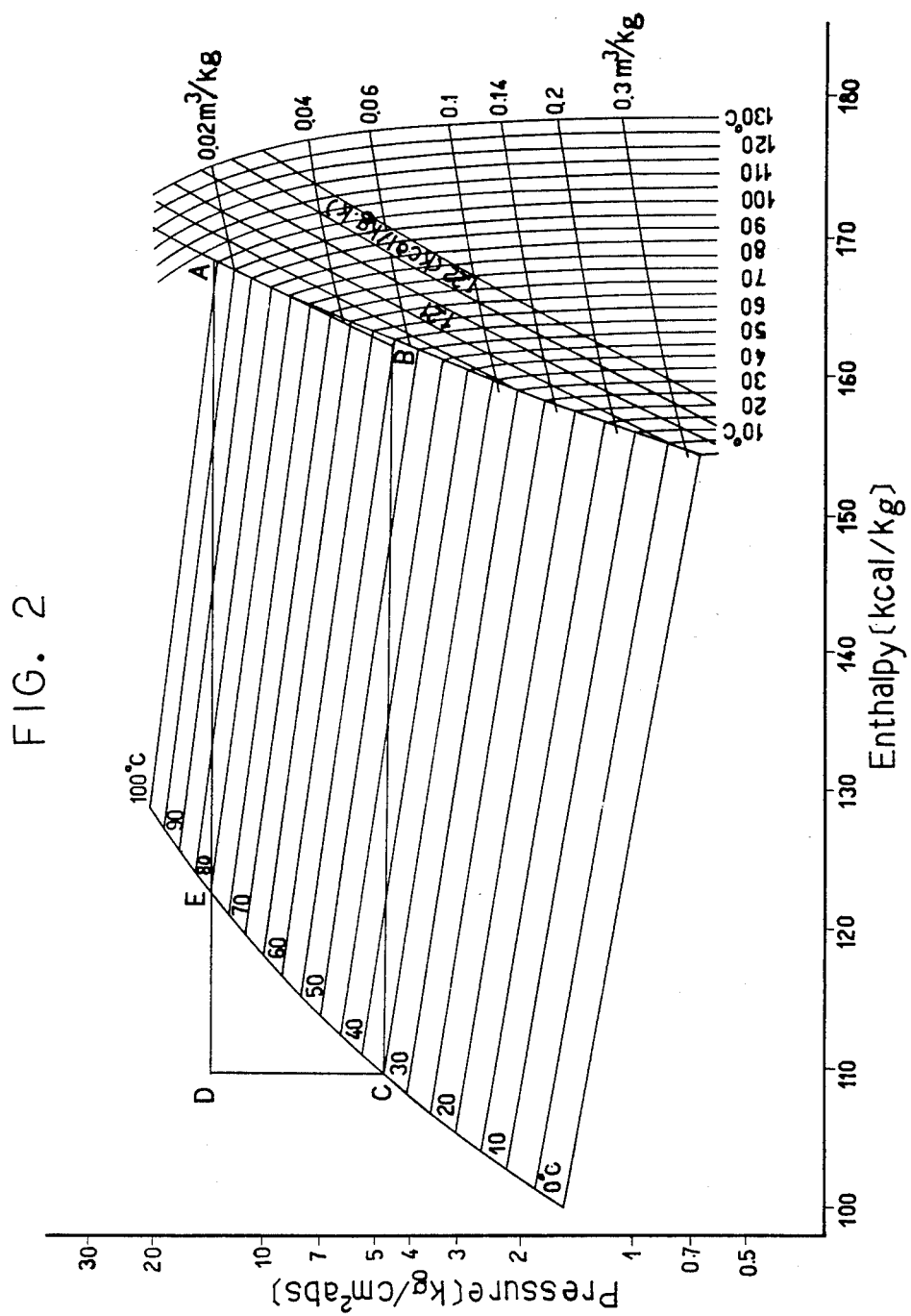
FIG. 2 is a pressure-enthalpy diagram (P-H diagram) of a mixture according to the invention which comprises 70% by weight of Flon-11 and 30% by weight of Flon-152a. The points A, B, C, D and E appearing in FIG. 2 correspond to those in FIG. 1 and following FIG. 3 which represent the respective points of state in the Rankine cycle carried out in Examples 1 to 3 below.
Figure 4:
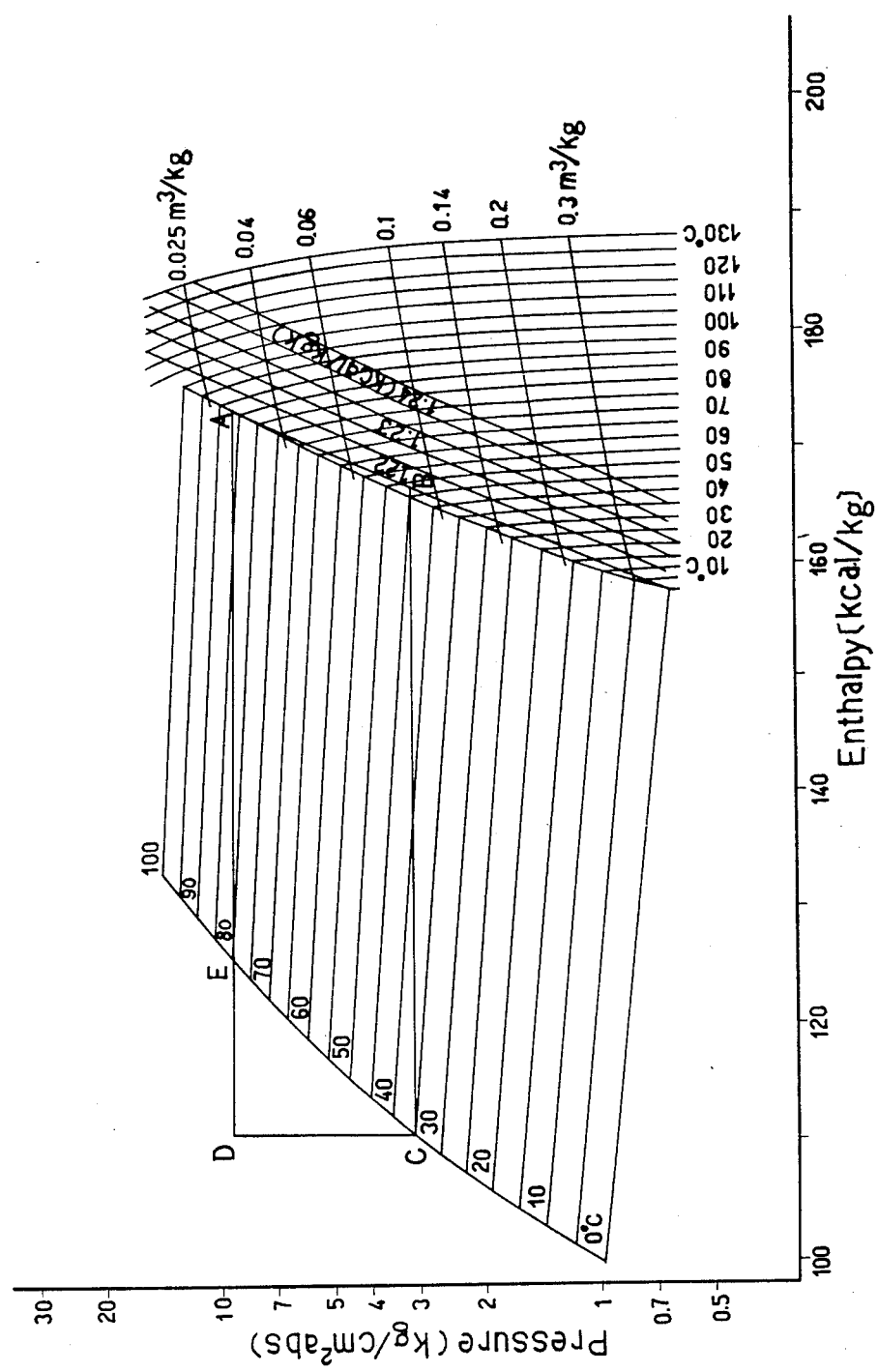
FIG. 4 is a pressure-enthalpy diagram (P-H diagram) of a mixture according to the invention comprising 70% by weight of Flon-11 and 30% by weight of isobutane. The points A, B, C, D and E appearing in FIG. 4 correspond to those in FIG. 1 and following FIG. 5 which represent the respective points of state in the Rankine cycle carried out in Examples 4 to 6 below.
Figure 6:
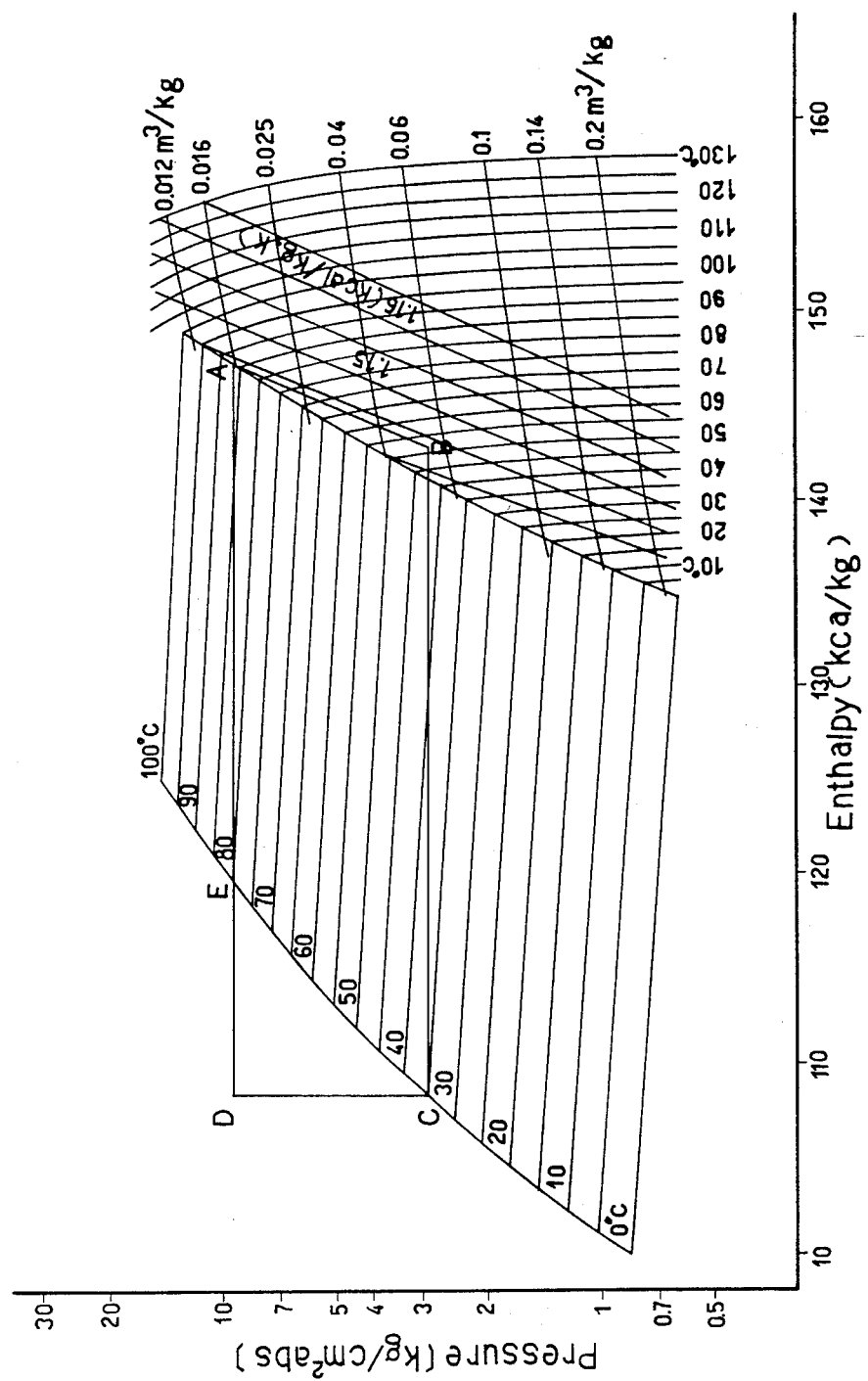
FIG. 6 is a pressure-enthalpy diagram (P-H diagram) of a mixture according to the invention which comprises 40% by weight of Flon-11 and 60% by weight of Flon-C318. The points A, B, C, D and E appearing in FIG. 6 correspond to those in FIG. 1 and following FIG. 7 which represent the respective points of state in the Rankine cycle carried out in Examples 7 to 9 below.

The Rankine cycle illustrated in FIGS. 1 to 3; 1, 4 and 5 or 1, 6 and 7 was carried out with use of the respective working fluids having compositions given in Table 1 below in the same apparatus under the following same conditions:

(i) temperature of hot water at point a in FIGS. 3, 5 or 7 ... 120° C.
(ii) temperature of cold water at point d in FIGS. 3, 5 or 7 ... 25° C.

The output characteristics were determined in the electric power generation obtained from conversion of thermal energy to mechanical energy at a charging rate of 1,000 t/h of hot water. The results are given in Table 2. The evaporation temperature was 80° C. and the the condensing temperature was 42° C.

TABLE 1

| Medium | Comp. Example | Example 1 | 2 | 3 | 4 | 5 | 6 | 7 | 8 | 9 |
|---|---|---|---|---|---|---|---|---|---|---|
| Flon-11 | 100 | 80 | 70 | 60 | 80 | 70 | 60 | 80 | 40 | 20 |
| Flon-152a |  | 20 | 30 | 40 |  |  |  |  |  |  |
| isobutane |  |  |  |  | 20 | 30 | 40 |  |  |  |
| Flon-C-318 |  |  |  |  |  |  |  | 20 | 60 | 80 |

TABLE 2

| Power output characteristics | Comp. Example | Example 1 | 2 | 3 | 4 | 5 | 6 | 7 | 8 | 9 |
|---|---|---|---|---|---|---|---|---|---|---|
| Adiabatic enthalpy drop (AE) (Kcal/kg) | 3.4 | 5.0 | 5.5 | 5.8 | 5.0 | 5.5 | 5.8 | 3.6 | 3.5 | 2.6 |
| Flow rate of working fluid (GF) (ton/hr) | 780 | 670 | 630 | 590 | 650 | 600 | 570 | 850 | 1070 | 1290 |
| Gross power output (POW) (KW) | 3000 | 3690 | 3830 | 3800 | 3570 | 3630 | 3640 | 3360 | 3750 | 3750 |
| Pump power for working fluid (PIA) (KW) | 150 | 220 | 250 | 280 | 190 | 200 | 220 | 180 | 280 | 360 |
| Pump power for cold & warm water (PIB) (KW) | 500 | 250 | 250 | 250 | 540 | 550 | 560 | 530 | 580 | 630 |
| Net power output (PWT) (KW) | 2030 | 3020 | 3130 | 3090 | 2510 | 2550 | 2520 | 2320 | 2530 | 2400 |

The results, as shown in Table 2, reveal that the working fluids comprising Flon-11 and one of Flon-152a, isobutane and Flon-C318 permit to exhibit electric power output characteristics which are significantly superior to that obtainable with use of working fluid comprising Flon-11 alone. The results further reveal that the working fluids permit to produce markedly increased electric power output in the range of content of 5 to 50% by weight of Flon-152a or isobutane or 20 to 80% by weight of Flon-C318. The results also reveal that the working fluids comprising Flon-11 and Flon-152a afford reduction of driving power of the pump because of its small pressure difference between evaporator and condenser.

In a glass tube were sealed a working fluid comprising Flon-11 or a mixture of Flon-11/Flon-152a (weight ratio 70/30), Flon-11/isobutane (70/30) or Flon-11/Flon-C318 (70/30) together with iron piece and lubricating oil. The sealed tube was heated at 150° C. for 100 hours and then the resulting working fluids were determined for concentration of halogen and amount of decomposition material by gas chromatography. The results are given in Table 3 below.

TABLE 3

| Working fluid | Conc. of halogen after heating (ppm) | Amount of decomposition material (%) | Remark |
|---|---|---|---|
| Flon-11 + Flon-152a | 100 | 0.5 | This invention |
| Flon-11 + isobutan | 120 | 0.3 | This invention |
| Flon-11 + Flon-C318 | 80 | 0.3 | This invention |
| Flon-11 | 180 | 0.7 | Control |

The results shown in Table 3 reveal that the working fluid of the invention comprising a mixture of Flon-11 and Flon-152a, isobutane or Flon-C318 forms a reduced amount of halogen ion and reduced amount of decomposition material determined by gas chromatography in contrast with the control working fluid comprising Flon-11 alone. With the mixed working fluid of Flon-11 and Flon-152a, isobutane or Flon-C318, it is derived that the reduced concentration of halogen formed at a high temperature reduces the corrosion of metal materials of the apparatus due to the working fluid and the reduced amount of decomposed material results in inhibition of change of thermodynamic properties as a working fluid for the Rankine cycle due to the decomposition material and in inhibition of reduction of the cycle efficiency.

Consequently, the working fluids of the invention comprising a mixture of Flon-11 and Flon-152a, isobutane or Flon-C318 is markedly superior to the heretofore known working fluids, such as Flon-11 in the energy-conversion efficiency, heat exchanging characteristics, thermal stability, and the like.

We claim:

1. Working fluids for the Rankine cycle comprising about 95 to about 50% by weight of trichlorofluoromethane and about 5 to about 50% by weight of a member selected from the group consisting of 1,1-difluoroethane, isobutane and octafluorocyclobutane.

2. Working fluids for the Rankine cycle according to claim 1 which comprises about 95 to about 50% by weight of trichlorofluoromethane and about 5 to about 50% by weight of isobutane.

* * * * *